United States Patent
Costeux et al.

(10) Patent No.: US 10,322,534 B2
(45) Date of Patent: Jun. 18, 2019

(54) MOLD PROCESS FOR MAKING NANOFOAM

(71) Applicant: Dow Global Technologies LLC, Midland, MI (US)

(72) Inventors: Stéphane Costeux, Midland, MI (US); Daniel A. Beaudoin, Midland, MI (US); Hyunwoo Kim, Midland, MI (US); Devin A. Foether, Vassar, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 150 days.

(21) Appl. No.: 15/121,604

(22) PCT Filed: May 20, 2015

(86) PCT No.: PCT/US2015/031655
§ 371 (c)(1),
(2) Date: Aug. 25, 2016

(87) PCT Pub. No.: WO2015/183639
PCT Pub. Date: Dec. 3, 2015

(65) Prior Publication Data
US 2017/0120486 A1   May 4, 2017

Related U.S. Application Data

(60) Provisional application No. 62/003,561, filed on May 28, 2014.

(51) Int. Cl.
*C08J 9/00* (2006.01)
*C08J 9/12* (2006.01)
(Continued)

(52) U.S. Cl.
CPC ............ *B29C 44/348* (2013.01); *B29C 44/02* (2013.01); *B29C 44/586* (2013.01); *C08J 9/0061* (2013.01);
(Continued)

(58) Field of Classification Search
CPC .... B29C 44/025; B29C 44/348; B29C 44/586
See application file for complete search history.

(56) References Cited

U.S. PATENT DOCUMENTS 4,473,665 A   9/1984 Martini-Vvedensky et al.
5,158,986 A   10/1992 Cha et al.
(Continued)

*Primary Examiner* — Stella K Yi
(74) *Attorney, Agent, or Firm* — Dow Global Technologies LLC

(57) ABSTRACT

Prepare nanofoam by: (a) providing a mold (10) with a mold cavity (12) defined by mold walls defining a sealable port (32); (b) providing a foamable polymer mixture containing a polymer and a blowing agent at a pressure at least 690 kilopascals above the saturation pressure for the polymer and blowing agent; (c) introducing the foamable polymer mixture into the mold cavity (12) while maintaining a temperature and pressure at least 690 kilopascals above the saturation pressure and controlling the pressure in the mold cavity (12) by expanding a wall of the mold; and (d) releasing pressure around the foamable mixture by moving a mold wall (20) at a rate of at least 45 centimeters per second, causing the foamable polymer mixture to expand into nanofoam having a porosity of at least 60 percent, a volume of at least 100 cubic centimeters and at least two orthogonal dimensions of four centimeter or more.

7 Claims, 1 Drawing Sheet

(51) Int. Cl.
  *B29C 44/02* (2006.01)
  *B29C 44/34* (2006.01)
  *B29C 44/58* (2006.01)
  *B29K 105/04* (2006.01)

(52) U.S. Cl.
  CPC ......... *C08J 9/122* (2013.01); *B29K 2105/041* (2013.01); *C08J 2203/06* (2013.01); *C08J 2203/08* (2013.01); *C08J 2205/042* (2013.01); *C08J 2325/12* (2013.01); *C08J 2333/06* (2013.01); *C08J 2333/12* (2013.01); *C08J 2425/12* (2013.01); *C08J 2433/06* (2013.01)

(56) References Cited

U.S. PATENT DOCUMENTS

| | | |
|---|---|---|
| 6,322,347 B1 | 11/2001 | Xu |
| 6,884,823 B1 | 4/2005 | Pierick et al. |
| 9,145,477 B2 | 9/2015 | Zhu et al. |
| 9,145,478 B2 | 9/2015 | Costeux et al. |
| 9,187,611 B2 | 11/2015 | Costeux et al. |
| 9,353,246 B2 | 5/2016 | Shankar et al. |
| 2009/0148665 A1 | 6/2009 | Thiagarajan et al. |
| 2011/0287260 A1 | 11/2011 | Sandler et al. |
| 2012/0144731 A1 | 6/2012 | Bohnke |
| 2012/0225272 A1* | 9/2012 | Costeux ................. C08J 9/0023 428/220 |
| 2012/0245243 A1 | 9/2012 | Lindner et al. |
| 2014/0200283 A1 | 7/2014 | Costeux et al. |

* cited by examiner

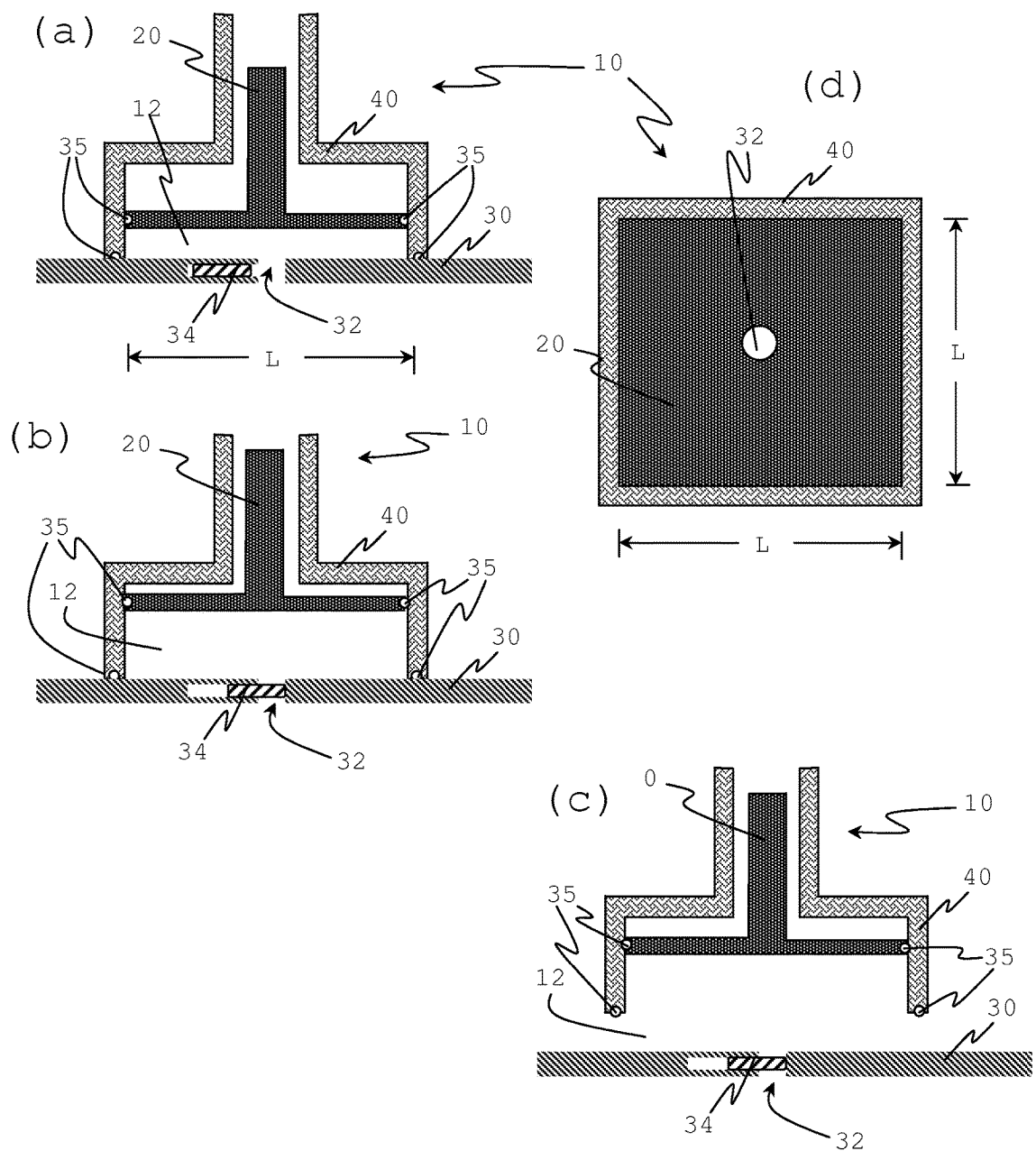

MOLD PROCESS FOR MAKING NANOFOAM

This invention was made with U.S. Government support under contract DE-EE0003916 awarded by the Department of Energy. The U.S. Government has certain rights in this invention.

BACKGROUND OF THE INVENTION

Field of the Invention

The present invention relates to a process for preparing polymeric foam having cell sizes below one micrometer by injecting a foamable polymer mixture into a mold with a movable wall and then triggering nucleation and expansion of the foamable polymer mixture.

INTRODUCTION

Polymeric foam having average cell sizes below one micrometer and at the same time one nanometer or larger are nanocellular foam, or simply nanofoam. The small cells of nanofoam inhibit thermal conductivity through nanofoam, making nanofoam desirable as a thermal insulating material. When the cell size of foam is less than about one micrometer the gas conductivity decreases in that cell due to what is known as the Knudsen Effect. The Knudsen Effect is a phenomenon that results in a decrease in thermal conductivity as fewer gas molecules are available within each cell to collide and transfer heat within each single cell. The Knudsen Effect becomes significant as the cell size and connectivity between cells becomes of the same order of magnitude as the mean free path of the gas filling the cells. Thermal conductivity due to cell gas reduces almost in half when the cell size reduces from one micrometer to 300 nanometers, and reduces by almost ⅔ when the cell size reduces from one micrometer to below 100 nanometers. Hence, nanofoam has a distinct advantage as a thermally insulating material over microcellular foam (foam having an average cell size of one micrometer or more).

Preparing nanofoam is challenging, particularly preparing nanofoam having a low density, such as having a porosity of 60 percent or more. Even more challenging is preparing nanofoam articles with such a low density that have a volume of 100 cubic centimeters ($cm^3$) or more as a single polymer foam, especially when the polymer foam has at least two orthogonal dimension each of 4 centimeters or more, or more challenging ten centimeters or more. Such large volume and cross sectional area is valuable if nanofoam is going to be viable for many commercial thermal insulating applications.

BRIEF SUMMARY OF THE INVENTION

The present invention provides a solution to the challenge of producing a single nanofoam having a porosity of 60 percent or more, a volume of at least 100 $cm^3$ and at least two orthogonal dimensions that are 4 centimeters or more, even ten centimeters or more. Moreover, the present process can be a semi-continuous process that offers greater efficiency than batch processes.

The solution is a result of discovering a way to fill a large mold with a foamable mixture of polymer and blowing agent while avoiding nucleation prior to introducing into the mold and prior to initiating foaming, and then quickly nucleating and foaming. The solution requires filling a mold with the foamable mixture while maintaining a pressure and temperature that keeps the blowing agent dissolved in the polymer and then rapidly releasing pressure around the foamable polymer mixture in order to initiate both nucleation and rapid foaming. Preferably, the process is free of applying a separate gas into the mold to create pressure around the foamable polymer mixture.

In a first aspect, the present invention is a process for preparing nanofoam comprising the following steps: (a) providing a mold having a mold cavity defined by mold walls, the mold walls comprising at least three pieces that form a sealed enclosure around the mold cavity while at least one wall is movable with respect the other walls, wherein the three pieces are opposing top plate and bottom plate and side plates oriented such that the side plates extend between the top and bottom plates, the mold further having a sealable port which provides access into the mold cavity when open and seals the mold cavity when shut; (b) providing a foamable polymer mixture comprising a polymer and a blowing agent where the foamable polymer mixture is at a temperature and pressure where at the temperature the pressure is at least 690 kilopascals above the pressure needed to fully dissolve the blowing agent in the polymer; (c) introducing the foamable polymer mixture into the mold cavity of the mold while maintaining a temperature and pressure where at the temperature the pressure is at least 690 kilopascals above the pressure needed to fully dissolve the blowing agent in the polymer and controlling the pressure by controlling the combined rate of introducing foamable polymer mixture into the mold cavity and movement of a wall of the mold to increase mold cavity volume; and (d) releasing the pressure around the foamable polymer mixture by moving at least one piece of the mold wall at a rate of at least 45 centimeters per second so as to increase the volume within the mold thereby causing the foamable polymer mixture to expand into a nanofoam having a porosity of at least 60 percent, a volume of at least 100 cubic centimeters and at least two orthogonal dimensions of four centimeters or more.

In a second aspect, the present invention is a nanofoam obtainable from the process of the first aspect, the nanofoam characterized by being a single foam having a porosity of at least 60 percent, a volume of at least 100 cubic centimeters and at least two orthogonal dimensions of four centimeters or more.

The process of the present invention is useful for preparing nanofoam, especially nanofoam having a volume of 100 $cm^3$ or more that has two orthogonal dimensions of greater than four centimeters, preferably ten centimeters or more, and that has a porosity of 60 percent of more. The foam of the present invention is useful, for example, as a thermal insulating material.

BRIEF DESCRIPTION OF THE DRAWINGS

FIG. 1 shows various cross sectional views of a suitable mold for use in the process of the present invention.

DETAILED DESCRIPTION OF THE INVENTION

"And/or" means "and, or alternatively". "Multiple" and "plurality" mean more than one. All ranges include endpoints unless otherwise stated.

Test methods refer to the most recent test method as of the priority date of this document unless a date is indicated with the test method number as a hyphenated two digit number.

References to test methods contain both a reference to the testing society and the test method number. Test method organizations are referenced by one of the following abbreviations: ASTM refers to ASTM International (formerly known as American Society for Testing and Materials); EN refers to European Norm; DIN refers to Deutsches Institut für Normung; and ISO refers to International Organization for Standards.

The process of the present invention requires providing a mold. The mold and mold cavity can be of any shape. For example, the mold and mold cavity can have a rectilinear, elliptical or circular cross section. The mold has a mold cavity defined by mold walls. The mold walls can completely surround the mold cavity forming a sealed chamber. The mold walls comprise at least three pieces: a top plate, a bottom plate and side plates. The top plate and bottom plate are generally opposing one another and typically are planar. The side plates can be a unitary structure or made of multiple individual plates that fit together so as to form a sealed frame forming a circumference around the mold cavity. The side walls extend between the top and bottom plate.

At least one wall is movable with respect to the other walls such that when the wall moves the volume of the mold cavity changes. Preferably, the top plate and side plate (or at least one, preferably each, side plate if there are multiple individual side plates) are movable with respect to the bottom plate. At least one of the plates can move with respect to the others while maintaining a sealed mold cavity yet while increasing or decreasing the volume of the mold cavity. For example, the top plate can move within the side plates and maintain a seal by means of a gasket or o-ring against the side plates while increasing or decreasing the mold cavity volume and while maintaining a sealed mold cavity.

The mold comprises a sealable port which provides access into the mold cavity through the mold walls when open and seals the mold cavity when shut. The sealable port allows introduction of foamable mixture into the mold cavity and then sealing of the mold cavity after introduction of the foamable mixture is complete.

"Sealed", in reference to the mold cavity, means that the mold cavity is pressure tight to a pressure of at least 41 megapascals (5900 pounds per square inch) when filled with a foamable composition. In reference to cavity walls, they form a "seal" with respect to one another if they form a joint that is pressure tight to a pressure of at least 41 megapascals when the mold cavity is filled with foamable polymer mixture.

One convenient mold has a rectangular, which can be square, mold cavity cross sectional shape with the cross section taken planar to opposing planar top and bottom plates and wherein each of the four sides of the rectangular mold cavity cross section is four centimeters (cm) or more, preferably six cm or more, more preferably eight cm or more and can be 10 cm or more and even 12 cm or more while at the same time each of the four sides of the rectangular mold cavity cross section is typically ten meters or less, more typically five meters or less, and even more typically one meter or less. The top plate of the mold is movable within the side plates so as to increase or decrease the volume of the mold cavity having the rectangular cross sectional shape.

FIG. 1 illustrates two cross sectional views of an example of one such convenient mold, 10. FIGS. 1(a) through 1(c) provide a cross sectional view that is perpendicular to coplanar top plate 20 and bottom plate 30 and through side plate piece 40. FIG. 1(d) provides a cross sectional view that is coplanar with top plate 20 and bottom plate 30 and provides a view into mold cavity 12 from top plate 20 down towards bottom plate 30. Bottom plate 30 had defined therein port 32 which can be opened or sealed closed using actuated gate 34 and through which there is access to mold cavity 12 when port 32 is open. FIGS. 1(a) and 1(d) show port 32 with actuated gate 34 in an open position while FIGS. 1(b) and 1(c) show the actuated gate 34 in a closed and sealed position. Top plate 20 is movable with respect to both bottom plate 30 and side plate piece 40. Likewise, side plate piece 40 is movable with respect to top plate 20 and bottom plate 30. For example, side plate piece 40 can be lifted off from bottom plate 30 to open mold cavity 12. Alternatively, or at the same time, top plate 20 can be moved with respect to one or both of bottom plate 30 and side plate piece 40. For example, FIG. 1(a) and FIG. 1(b) illustrate mold 10 with top plate 20 in two different locations with respect to bottom plate 30 and side plate piece 40. FIGS. 1(a) and 1(c) illustrate mold 10 with side plate piece 40 in two different positions with respect to top plate 20 and bottom plate 30. Mold cavity 12 has a rectangular cross section with each side having dimension L that is 10.16 cm (four inches) thereby defining a mold cavity 12 having a cross sectional area in excess of 100 square centimeters ($cm^2$). Top plate 20 is made of a copper nickel silicon chrome alloy sold under the trade name MoldMAX V™ (MoldMAX V is a trademark of Materion Bruch Inc.). Bottom plate 30 and side plate piece 40 are made of AISI 4140 carbon steel. Fluoroelastomer o-ring (Viton™ fluoroelastomer, Viton is a trademark of E.I. Du Pont De Nemours & Company) 35 resides between top plate 20 and side plate piece 40 to form a seal between top plate 20 and side plate piece 40 and between side plate piece 40 and bottom plate 30 to form a seal between side place piece 40 and bottom plate 30.

The process of the present invention includes providing a foamable polymer mixture comprising a polymer and a blowing agent. The polymer is desirably a thermoplastic polymer and more desirably a polymer selected from a group consisting of styrene-acrylonitrile (SAN) copolymers and acrylate polymers. Suitable acrylate polymers include any one or combination of more than one selected from polymethylmethacrylate (PMMA), methyl methacrylate/ethyl acrylate copolymer (MMA-co-EA), methyl methacrylate/methyl acrylate (MMA-co-MA) copolymer, methyl methacrylate/butyl methacrylate (MMA-co-BMA) copolymer, methyl methacrylate/ethyl methacrylate copolymer (MMA-co-EMA), methyl methacrylate/vinyl acetate copolymers, methyl methacrylate/vinyl acetate/ethyl acrylate copolymers, and essentially any copolymer of methyl methacrylate with acrylate or methacrylate monomers. The polymer can be a blend of SAN copolymer and one or more than one acrylate polymer.

The blowing agent desirably comprises carbon dioxide in either a liquid or, preferably, a supercritical state. Carbon dioxide desirably makes up from 50 mol % to 100 mol % of the total blowing agent. Additional blowing agents, if present, can be selected from any blowing agent commonly used for preparing polymeric foam. Suitable blowing agents include one or more than one of the following: inorganic gases such as argon, nitrogen, and air; organic blowing agents such as water, aliphatic and cyclic hydrocarbons having from one to nine carbons including methane, ethane, propane, n-butane, isobutane, n-pentane, isopentane, neopentane, cyclobutane, and cyclopentane; fully and partially halogenated alkanes and alkenes having from one to five carbons, preferably that are chlorine-free (e.g., difluoromethane (HFC-32), perfluoromethane, ethyl fluoride (HFC-161), 1,1,-difluoroethane (HFC-152a), 1,1,1-trifluoroethane (HFC-143a), 1,1,2,2-tetrafluoroethane (HFC-134), 1,1,1,2 tetrafluoroethane (HFC-134a), pentafluoroethane (HFC-125), perfluoroethane, 2,2-difluoropropane (HFC-272fb), 1,1,1-trifluoropropane (HFC-263fb), 1,1,1,2,3,3,3-heptafluoropropane (HFC-227ea), 1,1,1,3,3-pentafluoropropane (HFC-245fa), and 1,1,1,3,3-pentafluorobutane (HFC-365mfc)); aliphatic alcohols having from one to five carbons such as methanol, ethanol, n-propanol, and isopropanol; carbonyl containing compounds such as acetone, 2-butanone, and acetaldehyde; and ether containing compounds such as dimethyl ether, diethyl ether, methyl ethyl ether.

The concentration of total blowing agent in a foamable polymer mixture is desirably 18 wt % or more, preferably 20 wt % or more, even more preferably 22 wt % or more and most preferably 24 wt % or more in order to achieve desirable porosity. At the same time, the amount of blowing agent is generally 50 wt % or less, typically 45 wt % or less and often 40 wt % or less. Desirably, carbon dioxide is present at a concentration of 20 wt % or more, preferably 22 wt % or more and most preferably 25 wt % or more. At the same time, carbon dioxide is typically present at a concentration of 50 wt % or less, preferably 45 wt % or less and most preferably 40 wt % or less and can be 30 wt % or less or 28 wt % or less. Wt % is relative to the total weight of the foamable polymer mixture.

Provide the foamable mixture at a temperature and pressure sufficient for the blowing agent to be fully soluble in the polymer. Desirably, the pressure is at least 690 kilopascals (100 pounds per square inch), preferably 3.4 megapascals or more (500 pounds per square inch or more), more preferably 5.1 megapascals (750 pounds per square inch) or more, and yet more preferably 6.9 megapascals (1000 pounds per square inch) or more above the saturation pressure for the blowing agent in the polymer at its temperature in order to ensure there is no nucleation. "Saturation pressure" for a polymer and blowing agent combination is the pressure above which a given concentration of the blowing agent becomes completely soluble in the polymer at a given temperature.

To determine the saturation pressure for a polymer and blowing agent combination, collect solubility data for the blowing agent in the polymer at a given temperature and at multiple pressures by, for example, using a magnetic suspension balance. Fit the solubility data to a continuous model as a function of pressure at each temperature. An example of a suitable model is the PC-SAFT equation of state, which can be fitted to data using VLXE-Blend software (VLXE ApS, Denmark; http://www.vlxe.com/). Use the model to calculate the pressure at which the blowing agent solubility equals the given concentration of blowing agent in the foamable mixture at the measured temperature to determine saturation pressure at that measured temperature.

It is desirable to provide the foamable polymer mixture at a temperature below the softening temperature of the neat polymer components of the foamable polymer mixture but at a temperature where the foamable polymer mixture is still extrudable. For example, it is desirable to provide the foamable polymer mixture at a temperature of 80 degrees Celsius (° C.) or lower, and can be 70° C. or lower, 65° C. or lower, even 60° C. or lower or 55° C. or lower while at that same time is typically 20° C. or higher, preferably 25° C. or higher and can be 30° C. or higher, 40° C. or higher and even 50° C. or higher.

When the blowing agent is a plasticizing agent for the polymer of the foamable polymer mixture then the foamable polymer mixture can be extrudable at temperatures below the softening temperature of the neat polymer. One of ordinary skill can readily determine whether a blowing agent is a plasticizer for a polymer by evaluating how the blowing agent affects the softening temperature of the polymer. If the blowing agent lowers the softening temperature then the blowing agent is a plasticizer.

The "softening temperature" of a neat polymer, or neat polymer composition, refers to the softening temperature of only the polymeric components apart from any additives (for example, blowing agents or other plasticizers). The additives can act as plasticizers that reduce the effective softening temperature of the composition comprising the plasticizer. Such a plasticizing effect is not taken into account when referring to the softening temperature of a polymer composition, which is a property of the polymer composition alone. Blowing agents such as carbon dioxide are plasticizers for the polymers.

The softening temperature (Ts) for a polymer composition containing only semi-crystalline polymers is the melting temperature (Tm) for the polymer composition. The Ts for a polymer composition that only contains one or more than one amorphous polymers is the glass transition temperature (Tg) for the polymer composition. If a polymer composition contains a combination of semi-crystalline polymers and amorphous polymers, Ts is the Ts of the continuous phase polymer composition. If semi-crystalline and amorphous polymer phase are co-continuous then the Ts of the blend is the higher Ts of the two phases.

The melting temperature (Tm) for a semi-crystalline polymer is the temperature half-way through a crystalline-to-melt phase change as determined by differential scanning calorimetry (DSC) upon heating a crystallized polymer at a specific heating rate. Determine Tm for a semi-crystalline polymer according the DSC procedure in ASTM method E794-06. Determine Tm for a combination of polymers and for a filled polymer composition also by DSC under the same test conditions in ASTM method E794-06. Determine Tm using a heating rate of 10 degrees Celsius (° C.) per minute. If the polymer composition only contains miscible polymers and only one crystalline-to-melt phase change is evident in its DSC curve, then Tm for the polymer composition is the temperature half-way through the phase change. If multiple crystalline-to-melt phase changes are evident in a DSC curve due to the presence of immiscible polymers, then Tm for the polymer composition is the Tm of the continuous phase polymer. If more than one polymer is continuous and they are not miscible, then the Tm for the polymer composition is the highest Tm of the continuous phase polymers.

The glass transition temperature (Tg) for a polymer composition is as determined by DSC according to the procedure in ASTM method E1356-03 using a heating rate of 10 degrees Celsius (° C.) per minute. Determine Tg for a combination of polymers (for example, a polymer blend) and for a filled polymer composition also by DSC under the same test conditions in ASTM method E1356-03. If the combination of polymer or filled polymer composition only contains miscible polymers and only one glass transition phase change is evident in the DSC curve, then Tg of the polymer combination or filled polymer composition is the temperature half-way through the phase change. If multiple glass transition phase changes are evident in a DSC curve due to the presence of immiscible amorphous polymers, then Tg for the polymer combination or filled polymer composition is the Tg of the continuous phase polymer. If more than one amorphous polymer is continuous and they are not miscible, then the Tg for the polymer composition or filled polymer composition is the highest Tg of the continuous phase polymers.

Introduce the foamable mixture into the mold cavity of the mold while maintaining a temperature and pressure sufficient for the blowing agent to be fully soluble in the polymer and, hence, the foamable polymer mixture free from nucleation. Unlike other processes known in the art, the mold is filled with a foamable mixture and, moreover, introduced into the mold cavity without experiencing nucleation. To avoid nucleation, the temperature and pressure on the foamable mixture is maintained so as to keep the blowing agent fully soluble in the polymer while introducing the foamable mixture into the mold cavity. Control the pressure on the foamable mixture while introducing the foamable mixture into the mold cavity by controlling a combination of feed rate of foamable polymer composition into the mold cavity and rate of moving one or more movable wall of the mold to concomitantly increase mold cavity volume. That is, increase the mold cavity volume by moving one or more mold wall while introducing foamable mixture in the mold cavity but move the mold wall (or walls) at a rate that maintains a pressure high enough to prevent nucleation. It is desirable for the pressure on the foamable mixture to stay at least 690 kilopascals (100 pounds per square inch), preferably 3.4 megapascals or more (500 pounds per square inch or more), more preferably 5.1 megapascals (750 pounds per square inch) or more, and yet more preferably 6.9 megapascals (1000 pounds per square inch) or more above the saturation pressure for the blowing agent in the polymer at the polymer temperature while it is introduced into the mold in order to ensure there is no nucleation. Introduce the foamable mixture into the mold cavity through an open port and then close the port to seal the mold cavity when done introducing foamable mixture into the mold cavity.

Release the pressure in the mold cavity around the foamable polymer mixture by moving one or more than one piece of the mold wall (that is, one wall or multiple walls) at a rate of at least 45 centimeters per second (cm/s) so as to increase the volume within the mold and cause the foamable polymer mixture to expand into polymer nanofoam having a porosity of at least 60 percent, a volume of at least 100 cubic centimeters and at least two orthogonal dimensions of four centimeters or more, preferably eight cm or more and more preferably ten cm or more. Move the piece or pieces of mold wall so as to increase the volume of the mold cavity in order to release pressure around the foamable polymer mixture. The faster the piece(s) of mold wall is moved to increase the mold cavity volume the faster the pressure drop in the mold cavity. Faster pressure drops are generally more desirable than slower pressure drops in order to initiate more nucleation sites and, thereby, produce more and smaller cells in the resulting foam. Desirably, move the wall at a rate of 50 cm/s or faster, preferably 55 cm/s or faster, yet more preferably 60 cm/s or faster and even more preferably 65 cm/s or faster and yet more desirably 70 cm/s or faster when depressurizing the mold cavity. The volume of the mold cavity is increased to at least 100 cubic centimeters with two orthogonal dimensions of the mold cavity being or becoming at least four centimeters. Desirably, the mold cavity has two orthogonal dimensions prior to releasing pressure in the mold cavity that are at least four centimeters, preferably that are eight cm or more, more preferably 10 cm or more.

The process of the present invention is particularly valuable because it is readily adaptable to a semi-continuous process for producing polymer nanofoam. Currently, continuous extrusion processes are unable to make nanofoam having cross sectional dimensions anywhere near as large as the present process. Batch processes are costly for manufacturing. The present process can be adapted to be a semi-continuous process to allow for cost effective manufacturing of large dimension nanofoam. The semi-continuous process of the present invention includes preparing the foamable mixture in an extruder and directing it from the extruder into the mold cavity of a first mold. The mold can then be sealed off and foaming accomplished while the extruder either directs foamable mixture into other mold cavities of other molds or pauses to wait until the mold cavity of the first mold is emptied.

For example, the mold of FIG. 1 can be one or a series of molds that are filled with foamable polymer composition by an extruder. Foaming can occur using the mold of FIG. 1 by rapidly moving top plate 20 and/or side plate piece 40 with respect to bottom plate 30 so as to rapidly increase the volume of mold cavity 12. Once foaming is complete, side plate piece 40, if not already moved away from bottom plate 30, can be lifted off from bottom plate 40, the resulting foam removed from the bottom plate, and then side plate piece 40 replaced in a sealing configuration against bottom plate 30 and top plate 20 lowered towards bottom plate 30 so as to be ready to be filled again with foamable polymer composition for another foam. This process can be repeated with a single mold or with multiple molds in series or parallel to form a semi-continuous foaming process capable of preparing large dimension nanofoam. The semi-continuous process can include any number of molds as described herein that are used in cycle to make nanofoam, with the extruder filling one mold cavity after another and ultimately returning to the first mold cavity and refilling it after removing polymer nanofoam from that mold cavity and continuing in like manner through all the of the molds in a repeating cycle.

The process of the present invention can further incorporate a secondary expansion step after expansion in the mold cavity. A secondary expansion typically involves exposing the polymer nanofoam to heat, preferably steam, to soften the thermoplastic polymer of the nanofoam and causing it to expand further. The process can also be free of a secondary expansion step.

The process of the present invention is unique by preparing a foamable polymer mixture outside of a mold cavity, introducing the foamable polymer mixture into the mold cavity without experiencing nucleation, and then nucleating and expanding the foamable polymer mixture inside the cavity into a single polymer nanofoam of large volume and dimensions as taught herein. "Single foam" means a unitary foam structure prepared all at once as opposed, for example to a foam article that comprises multiple foams laminated together, which has seams between layers of foam. The single foam is a seamless structure that is prepared as a single material.

The process of the present invention thereby prepares the foam of the present invention. The foam of the present invention is a nanofoam obtainable from the process of the present invention and characterized by being a single foam having a porosity of at least 60 percent, a volume of at least 100 cubic centimeters and at least two orthogonal dimensions of four cm or more, preferably six cm or more, more preferably eight cm or more and most preferably 10 cm or more.

Preferably, the nanofoam of the present invention has an average cell size of 500 nanometers or less. Determine the average cell size of a nanofoam as the number-average cell size using the following method. Prepare a cross section of the polymer foam by cryo-fracturing the nanofoam. Examine a representative portion of the cross section by scanning electron microscopy (SEM), where the representative portion has dimensions in a range of two micrometers by two micrometers to twenty micrometers by twenty micrometers. Measure the cell size (distance across the cell, e.g., diameter) of 50-200 random cells in the portion of the cross section. Determine the average of all measured sizes to obtain the average cell size of the nanofoam.

The porosity of a foam characterizes the extent of void volume in the foam. Polymeric foam comprises a polymer matrix that defines within it multiple cells. The volume of a foam's cells corresponds to the void volume in the foam. Determine porosity of a foam as a percentage (p %) from the density of the foam ($\rho_f$) and the density of the polymer matrix material (all non-void material) of the foam ($\rho_m$) using the following equation:

$$p\ \% = [1-(\rho_f)/(\rho_m)] \times 100\%$$

Determine the density of the polymeric foam article ($\rho_f$) by the Archimedes method of ASTM method D-1622-03. Polymeric foam articles of the present invention desirably have a foam density of less than 0.4 grams per cubic centimeters (g/cm$^3$), and can have a density of 0.3 g/cm$^3$ or less, 0.2 g/cm$^3$ or less or even 0.18 g/cm$^3$ or less.

EXAMPLES

For each of the Examples (Exs) and Comparative Examples (Comp Exs), prepare polymer foam in the following general method. Specific values are in Table 1, below. Provide a mold as generally illustrated in and described with respect to FIG. 1.

Control the position of the top plate and side plate piece independently using hydraulic positioning systems that are controlled by computer. The positions of the top plate and side plate piece are tracked by computer by using linear differential transformers to translate their positions into digital signals. The computer controls the position of the top plate and side plate piece independently with hydraulic systems comprising a variable volume axial piston hydraulic pump with a 40 horse-power drive and a 5 gallon accumulator to store the energy needed for rapidly moving the top plate and side plate piece to open the mold cavity. The port in the bottom plate is opened and closed by an actuated gate.

Provide a polymer comprising 60 weight-percent (wt %) of a copolymer of methyl methacrylate and ethyl acrylate and 40 wt % of a styrene/acrylonitrile copolymer that is 15 wt % copolymerized acrylonitrile and that has a weight average molecular weight of 118,000 grams per mole into an extruder. The methyl methacrylate/ethyl acrylate copolymer is 8.9 wt % ethyl acrylate based on polymer weight, has a glass transition temperature of 95.3 degrees Celsius (° C.) and a melt flow rate of 10 decigrams per minute according to ASTM D1238 (3.8 kilograms and 230° C. and is commercially available as "VM100" from Arkema.

Prepare a foamable mixture in an extruder by first heating the polymer in the extruder to form a polymer melt at 180° C. Introduce 25 weight-parts carbon dioxide per 100 weight-parts polymer melt at the 180° C. and at 56 megapascals (8000 pounds per square inch) pressure and mix together for approximately four minutes within the extruder. Cool the carbon dioxide/polymer mixture over 30 minutes and while still in the extruder to a temperature and pressure sufficient to dissolve the carbon dioxide into the polymer. The temperature for Examples 1-3 and Comparative Example A is 63° C. and the temperature for Examples 4-9 and Comparative Example B is 56° C. The pressure is in a range of 34.5 megapascals to 41.5 megapascals (5000-6000 pounds per square inch).

Prepare the mold to receive foamable mixture with the mold in the orientation of FIG. 1(a) with the mold cavity fully sealed. Preheat the mold to approximately 60° C. Open the port in the bottom plate by triggering the actuator to open. Direct foamable polymer mixture into the mold cavity through the port while moving the top plate so as to increase the mold cavity volume while maintaining sufficient pressure on the foamable polymer mixture so as to keep the blowing agent fully dissolved, preferably while maintain a pressure of at least 690 kilopascals above the pressure needed to keep the blowing agent fully dissolved (see pressures in Table 1). The mold cavity when full has dimensions of 10.16 cm by 10.16 cm by one cm high. Once the mold cavity is full, close the port by triggering the actuator to close thereby sealing the mold cavity.

For Examples 1-9 equilibrate the foamable polymer mixture in the mold cavity for ten minutes at a pressure above 31 megapascals (4500 pounds per square inch).

For Comparative Examples A and B slowly move the tip plate to relieve the pressure in the mold cavity to 16.9 megapascals and 23.2 megapascals respectively and allow the foamable mixture to equilibrate at that pressure for ten minutes. It is expected that nucleation begins in the foamable mixture during this time.

After the foamable mixture equilibrates, rapidly release the pressure in the mold cavity by hydraulically moving the top plate and side plate piece simultaneously away from the bottom plate so that the top plate travels at a rate in excess of 45 cm/s. Stop the top plate's motion when it is approximately 8.8 cm above the bottom plate. The foamable mixture rapidly expands into polymer foam upon rapid release of the mold cavity pressure. Notably, the foam expands in all dimensions and therefore the dimensions of the resulting foam exceed those of the mold cavity.

For Example 9, post foam the polymer nanofoam obtained from the mold by immersing the foam for three minutes into a water bath at 60° C.

Characterize the resulting polymer by determining porosity, average cell size, cross sectional dimensions (cross section in plane of top and bottom plate) and volume. Results are in Table 1.

TABLE 1

| Sample | Mold Cavity Temp (° C.) | Pressure in Mold (MPa) | Pressure in Mold required to fully dissolve blowing agent (MPa) | Speed of top plate and side plate pieces during depressurization (cm/s) | Porosity (%) | Average Cell Size (nm) | Foam Volume (cm$^3$) | Foam Cross Section Dimensions (cm) |
|---|---|---|---|---|---|---|---|---|
| Comp Ex A | 62 | 16.9 | 27.6 | 62 | 83 | 11300 | 405 | 14.5 × 14.5 |
| Ex 1 | 62 | 35.5 | 27.6 | 62 | 73 | 530 | 304 | 13 × 13 |
| Ex 2 | 62 | 33.0 | 27.6 | 62 | 73 | 790 | 293 | 13 × 13 |

TABLE 1-continued

| Sample | Mold Cavity Temp (° C.) | Pressure in Mold (MPa) | Pressure in Mold required to fully dissolve blowing agent (MPa) | Speed of top plate and side plate pieces during depressurization (cm/s) | Porosity (%) | Average Cell Size (nm) | Foam Volume (cm³) | Foam Cross Section Dimensions (cm) |
|---|---|---|---|---|---|---|---|---|
| Ex 3 | 62 | 35.5 | 27.6 | 62 | 74 | 950 | 304 | 13 × 13 |
| Comp Ex B | 54 | 23.3 | 22.8 | 62 | 75 | 4276 | 320 | 14 × 14 |
| Ex 4 | 54 | 34.3 | 22.1 | 62 | 71 | 564 | 292 | 13.5 × 13.5 |
| Ex 5 | 54 | 35.5 | 22.8 | 62 | 72 | 481 | 304 | 13.5 × 13.5 |
| Ex 6 | 54 | 35.5 | 22.8 | 62 | 72 | 449 | 298 | 13.5 × 13.5 |
| Ex 7 | 54 | 40.5 | 22.1 | 74 | 71 | 720 | 293 | 14 × 14 |
| Ex 8 | 54 | 40.5 | 22.8 | 74 | 71 | 592 | 298 | 14 × 14 |
| Ex 9 | 54 | 40.5 | 22.8 | 74 | 78 | 612 | 397 | 16 × 16.5 |

Comparative Example (Comp Ex) A and B illustrate the effect of what happens when nucleation occurs in the foamable polymer mixture prior to sudden pressure release initiate foaming. Comp Ex A and B experienced a reduction in pressure to a pressure less than 690 kilopascals higher than that necessary to keep the blowing agent fully dissolved in the polymer. As a result, the blowing agent is expected to have nucleated during that time. Such a "pre-nucleation" results in micrometer sized cells rather than nanometer sized cells. In contrast, each of Examples 1-9 avoided pre-nucleation by sustaining a pressure sufficient to keep the blowing agent fully dissolved in the polymer until suddenly releasing the pressure to initiate foaming. Each of Examples 1-9 have sub-micrometer sized cells and qualify as nanofoam.

The process of the present invention also allows formation of single foam having a volume in excess of 100 cm³ and cross sectional dimension in excess of 10 cm×10 cm as each of the examples illustrate.

The invention claimed is:

1. A process for preparing nanofoam comprising the following steps:
   a. providing a mold having a mold cavity defined by mold walls, the mold walls comprising at least three pieces that form a sealed enclosure around the mold cavity while at least one wall is movable with respect to other walls, wherein the at least three pieces are opposing top plate and bottom plate and side plates oriented such that the side plates extend between the top and bottom plates, the mold further having a sealable port which provides access into the mold cavity when open and seals the mold cavity when shut;
   b. providing a foamable polymer mixture comprising a polymer and a blowing agent where the polymer is selected from a group consisting of styrene acrylonitrile copolymers and acrylate polymers and where the foamable polymer mixture is at a temperature and pressure where at the temperature the pressure is at least 690 kilopascals above the pressure needed to fully dissolve the blowing agent in the polymer;
   c. introducing the foamable polymer mixture into the mold cavity of the mold while maintaining a temperature and pressure where at the temperature the pressure is at least 690 kilopascals above the pressure needed to fully dissolve the blowing agent in the polymer and controlling the pressure by controlling a combined rate of introducing foamable polymer mixture into the mold cavity and movement of a wall of the mold to increase mold cavity volume; and
   d. releasing the pressure around the foamable polymer mixture by moving at least one piece of the mold wall at a rate of at least 45 centimeters per second so as to increase the volume within the mold thereby causing the foamable polymer mixture to expand into a nanofoam having a porosity of at least 60 percent, a volume of at least 100 cubic centimeters and at least two orthogonal dimensions of four centimeters or more.

2. The process of claim 1, wherein the mold in step (a) is further characterized by the side plates being a single piece that sets on top of and seals against the bottom plate and the top plate fit within and seals against the side plates while being movable within the side plates and wherein the top plate moves within the side plates to increase mold cavity volume during introduction of foamable polymer mixture into the mold cavity in step (c).

3. The process of claim 1, further characterized by releasing the pressure in step (d) by sequentially moving the top plate relative to the side plates and then moving the side plates relative to the bottom plate so as to leave the resulting foam setting on the bottom plate free of the side plates and top plate.

4. The process of claim 1, further characterized by the blowing agent consisting of carbon dioxide.

5. The process of claim 1, further characterized by the mold cavity having two orthogonal dimensions prior to step (d) that are each at least four centimeters.

6. The process of claim 1, where the foamable polymer mixture is provided in step (b) from an extruder that directs the foamable polymer mixture into the mold cavity in step (c) through a gate valve in a semi-continuous manner whereby steps (b), (c) and (d) are repeated in a cycle with an additional step (e) of removing the nanofoam from the mold cavity following step (d) in the cycle.

7. The process of claim 1, further characterized by having a post-expansion step after step (d) where the resulting foam is exposed to heat and optionally steam to further expand.

* * * * *